(12) United States Patent
Syrjärinne et al.

(10) Patent No.: US 6,424,890 B1
(45) Date of Patent: Jul. 23, 2002

(54) METHOD AND APPARATUS FOR SATELLITE ORBIT INTERPOLATION USING PIECEWISE HERMITE INTERPOLATING POLYNOMIALS

(75) Inventors: Paula Syrjärinne; Robert Piché, both of Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/727,371

(22) Filed: Nov. 30, 2000

(51) Int. Cl.$^7$ .............................. B64G 1/24; B64G 1/38
(52) U.S. Cl. ...................... 701/13; 701/200; 701/226; 244/158 R; 342/357.06
(58) Field of Search ...................... 701/13, 226, 224, 701/200, 4; 244/158 R, 164; 342/357.06, 356, 357.01, 357.02

(56) References Cited

U.S. PATENT DOCUMENTS

| | | | | |
|---|---|---|---|---|
| 4,445,118 A | * | 4/1984 | Taylor et al. | 342/356 |
| 4,797,677 A | * | 1/1989 | MacDoran et al. | 342/352 |
| 5,751,244 A | * | 5/1998 | Huston et al. | 342/357 |
| 5,936,571 A | * | 8/1999 | Desjardins | 701/213 |
| 5,949,374 A | * | 9/1999 | Nelson, Jr. | 342/357.15 |
| 6,016,117 A | * | 1/2000 | Nelson, Jr. | 342/352 |
| 6,144,336 A | * | 11/2000 | Pretson et al. | 342/357.09 |

OTHER PUBLICATIONS

D. Kincaid, D. and W. Cheney, Numerical Analysis, Second Edition. Pacific Grove, California, available from Brooks/Cole Publishing Company, copyright 1996, pp. 363–372.

\* cited by examiner

Primary Examiner—William A. Cuchlinski, Jr.
Assistant Examiner—Olga Hernandez
(74) Attorney, Agent, or Firm—Ware, Fressola, Van der Sluys & Adolphson LLP

(57) ABSTRACT

A method and corresponding apparatus and system for determining the position of a satellite at any instant of time between two sampling instants, based on information in at least one ephemeris message provided by the satellite, the information allowing the computation of the satellite positions at the two sampling instants. The method includes the steps of: computing the satellite positions at two sampling instants using parameters provided in one or more ephemeris messages with suitable times of ephemeris; and for each of the three dimensions of motion, constructing a polynomial of at least third degree by choosing the coefficients of the polynomial so that it interpolates the satellite position at each of the two sampling instants. Typically, the method also calls for computing the satellite velocities at each of the sampling instants, and choosing the coefficients of the polynomial for each of the three dimensions of motion so as to provide a polynomial that not only interpolates the satellite position at the two sampling instants, but has a first derivative that interpolates the satellite velocity at the two sampling instants. The polynomial and its derivative can then be evaluated at any desired time between the sampling instants to determine the spacecraft position and velocity, respectively, at the desired time. The method also provides for determining at least a fifth degree polynomial by using values of the spacecraft acceleration, at each of the sampling instants, calculated from the ephemeris information. The polynomial is typically a Hermite interpolating polynomial.

26 Claims, 2 Drawing Sheets

METHOD AND APPARATUS FOR SATELLITE ORBIT INTERPOLATION USING PIECEWISE HERMITE INTERPOLATING POLYNOMIALS

FIELD OF THE INVENTION

The present invention relates to the field of satellite-based positioning, and more particularly to approximating satellite motion.

BACKGROUND OF THE INVENTION

Typically, a Global Positioning System (GPS) receiver determines its position based on measuring relative times-of-arrival (TOA) of signals synchronously transmitted from satellites. Such signals include a timestamp indicating when they were transmitted by the satellites. The satellite positions can be calculated as a function of time based on 16 parameters transmitted in each satellite's ephemeris message, six of the parameters being equivalent to so-called Keplerian elements, and the other nine parameters being perturbation corrections to the Keplerian elements. The parameters are all time dependent, and the values provided in an ephemeris message are valid only for approximately four hours from the time of ephemeris, also included in the ephemeris message.

In a conventional computation of satellite position, the parameters of the ephemeris message of a satellite and current GPS time are substituted into a number of equations so as to solve for the satellite position. Usually, Earth-centered Earth-fixed (ECEP) coordinates are used. Often, in addition to the position of each satellite, the velocity of each satellite is also used in determining the GPS receiver position and/or the GPS receiver velocity. One way to calculate the satellite velocity is to form the derivatives of the equations used to determine the satellite position.

The conventional computation of satellite position and velocity based on the ephemeris parameters is computationally burdensome. Nearly 20 equations must be solved, involving complicated operations, such as evaluating trigonometric functions and square roots. One of the equations to be solved is transcendental, and so must be solved iteratively. Often the ephemeris data from several satellites, usually from 4 to 12 satellites, are used (simultaneously) to triangulate to determine the GPS receiver position. In some GPS receiver applications, it is necessary to compute the positions and velocities of a number of satellites repeatedly, as often as once every second; even after solving the nearly 20 equations for a satellite position and velocity at one time, for each additional time at which the satellite position is to be determined, the nearly 20 equations must be solved again. With current processing capability, such computations of the satellite positions and velocities places a significant load on a typical processor of a GPS receiver.

What is needed is a way to solve for a satellite position and velocity that is sufficiently accurate for GPS applications, and yet reduces the computational burden compared to that of the conventional computation of satellite position and velocity.

SUMMARY OF THE INVENTION

Accordingly, the present invention provides, a method and corresponding apparatus and system for determining the position of a satellite at any instant of time between two sampling instants, based on information in at least one ephemeris message, or other suitable navigation message originating from the satellite, provided by the satellite, the information allowing the computation of the satellite positions at the two sampling instants, the method including the steps of: setting the first sampling instant; computing the satellite position at the first sampling instant using parameters provided in an ephemeris message, or suitable other navigation message originating from the satellite, with a suitable time of ephemeris or other time reference indicating a time of validity of the message; setting a next sampling instant later than the first sampling instant; computing the satellite position at the second sampling instant again using parameters provided in an ephemeris message, or other suitable navigation message originating from the satellite, with a suitable time of ephemeris or other time reference indicating a time of validity of the message; and for each of the three dimensions of motion, constructing a polynomial of at least third degree by choosing the coefficients of the polynomial so that the polynomial interpolates the satellite position at each of the sampling instants.

In a further aspect of the invention, the method also includes the steps of: computing the satellites velocities at each of the sampling instants based on the same parameters as were used in computing the satellite positions at the sampling instant; and choosing the coefficients of the polynomial for each of the three dimensions of motion so as to provide a polynomial that not only interpolates the satellite position at each of the sampling instants, but is such that its first derivative interpolates the satellite velocity at each of the sampling instants.

In another, further aspect of the invention, the polynomial is a Hermite interpolating polynomial.

According to the invention, to obtain an approximate spacecraft position at a desired instant of time between the two sampling instants, the polynomial so determined is evaluated at the desired instant of time.

Further according to the invention, the derivative of the polynomial is evaluated at an instant of time between the two sampling instants so as to determine the spacecraft velocity at the instant of time.

In a still further aspect of the invention, the polynomial is of at least fifth degree, and the method of the invention includes the further steps of: calculating the satellite acceleration at each of the sampling instants based on the same parameters as were used in computing the satellite positions at the sampling instant; and choosing the coefficients of the polynomial for each of the three dimensions of motion so as to provide a polynomial corresponding to the two sampling instants that interpolates the satellite position at the two sampling instants, and further is such that its first derivative interpolates the satellite velocity at the two sampling instants and its second derivative interpolates the satellite acceleration at the two sampling instants. In an application according to this further aspect of the invention, the second derivative of the polynomial is evaluated at an instant of time between the two sampling instants so as to determine the spacecraft acceleration at the instant of time.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
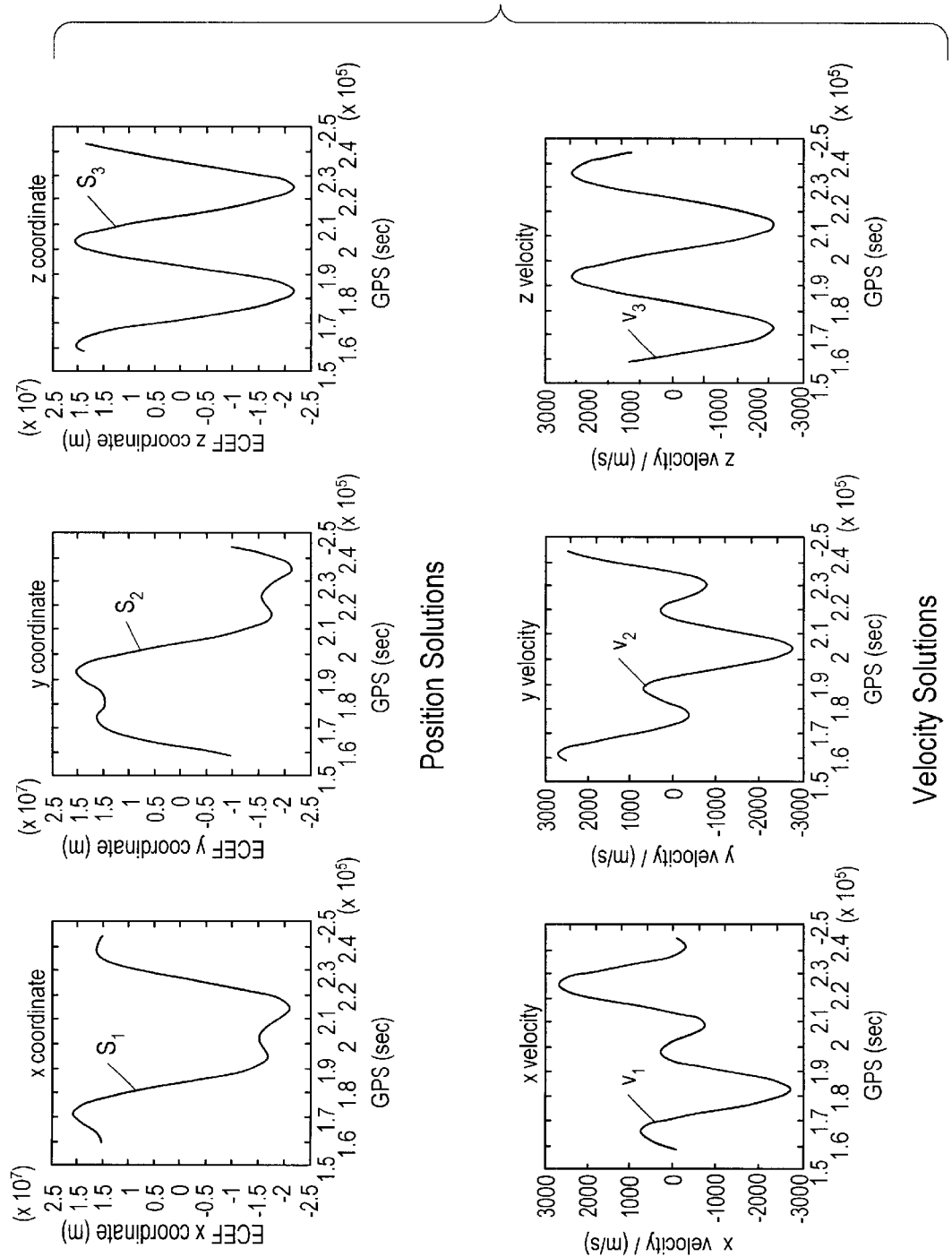
FIG. 1 is a set of curves illustrative of curves that are the solutions to the equations used in a conventional calculation of a satellite position and velocity (in Earth-centered, Earth-fixed coordinates), and are representative of the curves to be interpolated according to the present invention.

A rigorous computation of a satellite position at a particular time (i.e. according to a conventional ephemeris calculation) is, for many applications including many global positioning system (GPS) receiver applications, unnecessary since the orbits trace out smooth curves of simple shape, as indicated in FIG. 1, which shows typical curves for the position of a satellite, in terms of x, y and z Earth-centered Earth-fixed coordinates labeled $s_1, s_2$, and $s_3$, and typical corresponding curves for the satellite velocity, labeled $v_1, v_2$, and $v_3$. Because the curves are smooth, satellite positions or velocities between points (called here sample points) on a curve representing a satellite position or velocity on orbit are advantageously approximated by interpolation. The time interval (sampling interval) between sample points is determined for a particular application so as to provide a tradeoff between accuracy and computational burden acceptable for the application. Thus, the position and velocity of a satellite are determined at each of the sample points, separated by the predetermined orbit interval (sampling interval), using a conventional ephemeris calculation for the period of validity of the orbit parameters provided by an ephemeris message (or, in other embodiments besides the best mode, any other suitable navigation message originating from the satellite), and the position and velocity of the satellite at intermediate points (i.e. at intermediate times) are determined using polynomial interpolation, a polynomial being determined to give spacecraft position at intermediate points by fitting the position and velocity data at the sampling points, and the position polynomial then differentiated to provide another interpolation polynomial, the velocity polynomial, to fit the spacecraft velocity on orbit.

In the preferred embodiment of the present invention, each of the three dimensions of a satellite orbit is calculated separately, allowing the use of one-dimensional curve-fitting techniques. However, care must be taken in the way that the interpolation is carried out, because for many applications, including many GPS receiver applications, the allowed relative error is small. For example, in two hours a satellite moves nearly 30 thousand kilometers, but even an error of one meter in the satellite position causes a significant error in the navigation solution, i.e. in determining the position of the GPS receiver.

In fitting interpolating polynomials to curves representing satellite orbits, it is preferable to use polynomials of rather low degree, typically less than $5^{th}$ degree. Polynomials of high degree introduce unwanted oscillations between sampled orbital points, and so are not usable. On the other hand, to keep the relative error sufficiently small, a low degree polynomial is sufficiently accurate only for a short length of orbit. Therefore, according to the present invention, an orbit is represented by a piecewise interpolation polynomial using a low degree polynomial for each piece of orbit.

The requirements for an orbit interpolation method include continuity, low computational complexity, and sufficient precision. The requirement of continuity prevents jumpy (discontinuous) satellite position approximations, which would cause navigation solutions to be correspondingly jumpy. The requirement of precision guarantees that the interpolating curve is a close fit to the orbit calculated from ephemeris; an interpolation error of at most approximately +/−10 cm in each dimension is acceptable for typical GPS applications.

More precise polynomial fits are achieved if not only satellite position values at the sampling points are used, but also first and possibly second derivatives of the satellite position at the sampling points, i.e. velocities and accelerations. One method where derivatives (with respect to time) at sampling points are used is known as Hermite interpolation. See, e.g. D. Kincaid, D. and W. Cheney, *Numerical Analysis*, Second Edition. Pacific Grove, Calif., available from Brooks/Cole Publishing Company, copyright 1996, pp. 363–372. According to the present invention, a piecewise Hermite interpolating polynomial, using a low-degree polynomial, is used to fit the sample values (satellite coordinates).

For satellite orbit approximations, there are two very suitable Hermite polynomial interpolation methods. In the first method, a cubic (of degree three) polynomial is fitted between two consecutive sampling points based on the satellite position and velocity determined by plugging the ephemeris parameters into a conventional ephemeris computation at each sample point. The second alternative is similar, but the polynomial used is of $5^{th}$ degree, i.e. a quintic polynomial, and in addition to fitting the polynomial based on position and velocity of the satellite at each sample point, acceleration of the satellite at each sample point is also used. The satellite acceleration is also computed using a conventional ephemeris computation (by differentiating the equations used to solve for velocity). The quintic method is computationally more burdensome, but also highly precise. The cubic method, however, may be more useful for many applications, because of the precision it provides for the computational burden it imposes.

As mentioned above, according to the present invention, the problem of fitting a polynomial to satellite position data is decomposed from a three-dimensional problem to three one-dimensional problems. In the preferred embodiment, the three-dimensional problem is decomposed into three one-dimensional problems by projecting the three-dimensional motion onto three orthogonal planes, corresponding to three basis vectors, an x basis vector, a y basis vector, and a z basis vector, the three basis vectors spanning an Earth-centered Earth-fixed (ECEF) coordinate system.

Detail of Method Using Only Position and Velocity of a Satellite (Cubic Hermite Interpolation)

According to the present invention, cubic Hermite interpolation, based on computed satellite positions and velocities, is used to determine points on a satellite orbit between sampling points, when a tradeoff between high precision and computational burden is advantageous (such as in many GPS applications). Such a cubic Hermite interpolation is performed as follows.

a) Set the sampling interval d (e.g. three minutes)
b) Set the first sampling instant $t_0$ and compute the satellite position $s_0$ and velocity $v_0$ at the sampling instant $t_0$ using a conventional ephemeris calculation (using the parameters provided in an ephemeris message with a suitable time of ephemeris).
c) Set the next sampling instant one sampling interval away from $t_0$, i.e. at $t_1 = t_0 + d$.
d) Calculate the satellite position $s_1$ and velocity $v_1$ at time $t = t_1$ (again using a conventional ephemeris calculation).
e) For each of the three dimensions of motion, indicated by the index i=1, . . . , 3, construct a cubic polynomial $p_i(t)$ satisfying the Hermite interpolation conditions, i.e. construct a cubic polynomial, $$p_i(t)=c_{0i}+c_{1i}x_i+c_{2i}x_i^2+c_{3i}x_i^3$$

for each dimension i, and choose the coefficients $c_{0i},c_{1i}$, $c_{2i}$, and $c_{3i}$ such that the Hermite interpolation conditions, $$p_i(t_0)=s_{0i},\ p_i'(t_0)=v_{0i}\ \text{and}\ p_i(t_1)=s_{1i},\ p_i'(t_1)=v_{1i},$$

are satisfied.
f) While $t \leq t_1$, use the polynomials $p_i(t)$ and their first derivatives (with respect to time) $p_i'(t)$, to compute the satellite position and velocity, respectively.
g) When $t>t_1$, set $t_0=t_1$, $s_0=s_1$, $v_0=v_1$, and return to step c).

Detail of Method Using Position, Velocity, and Acceleration of a Satellite (Quintic Hermite Interpolation)

According to the present invention, quintic Hermite interpolation, based on computed satellite positions, velocities, and accelerations, is used to determine the position and velocity of a satellite in between sample points when high precision is needed and computational burden is a lesser consideration. Such a quintic Hermite interpolation is performed in the same way as explained above for a cubic Hermite interpolation, except that at each of the two sampling instants $t_0$ and $t_1=t_0+d$, not only are the position $s_{0i},s_{1i}$ and velocity $v_{0i},v_{1i}$ computed using the ephemeris message parameters, but also the acceleration $a_{0i},a_{1i}$ for each dimension i, and instead of a cubic Hermite interpolating polynomial, a quintic Hermite interpolating polynomial is used. Thus, according to the present invention, in applications where greater precision is required than can be provided by using a piecewise cubic Hermite interpolating polynomial, a piecewise quintic Hermite interpolation polynomial is used according to the following procedure, a) Set the sampling interval d (e.g. three minutes)
b) Set the first sampling instant $t_0$ and compute the satellite position $s_0$, velocity $v_0$, and acceleration $a_0$ at the sampling instant $t_0$ using a conventional ephemeris calculation (using the parameters provided in an ephemeris message with a suitable time of ephemeris).
c) Set the next sampling instant one sampling interval away from $t_0$, i.e. at $t_1=t_0+d$.
d) Calculate the satellite position $s_1$, velocity $v_1$, and acceleration $a_1$ at time $t=t_1$ (again using a conventional ephemeris calculation).
e) For each of the three dimensions of motion, indicated by the index $i=1,\ldots,3$, construct a quintic polynomial $p_i(t)$ satisfying the Hermite interpolation conditions, i.e. construct a quintic polynomial, $$p_i(t) = c_{0i} + c_{1i}x_i + c_{2i}x_i^2 + c_{3i}x_i^3 + c_{4i}x_i^4 + c_{5i}x_i^5$$

for each dimension i, and choose the coefficients $c_{0i},c_{1i}$, $c_{2i},c_{3i},c_{4i}$ and $c_{5i}$ such that the Hermite interpolation conditions, $$p_i(t_0)=s_{0i},\ p_i'(t_0)=v_{0i},\ p_i''(t_0)=a_{0i}\ \text{and}\ p_i(t_1)=s_{1i},\ p_i'(t_1)=v_{1i},\ p_i''(t_1)=a_{1i}$$

are satisfied.
f) While $t \leq t_1$, use the polynomials $p_i(t)$, their first derivatives $p_i'(t)$, and their second derivatives $p_i''(t)$ to compute the satellite position, velocity, and acceleration, respectively.
g) When $t>t_1$, set $t_0=t_1$, $s_0=s_1$, $v_0=v_1$, and $a_0=a_1$, and then return to step c).

The Method of the Invention in General

Figure 2:
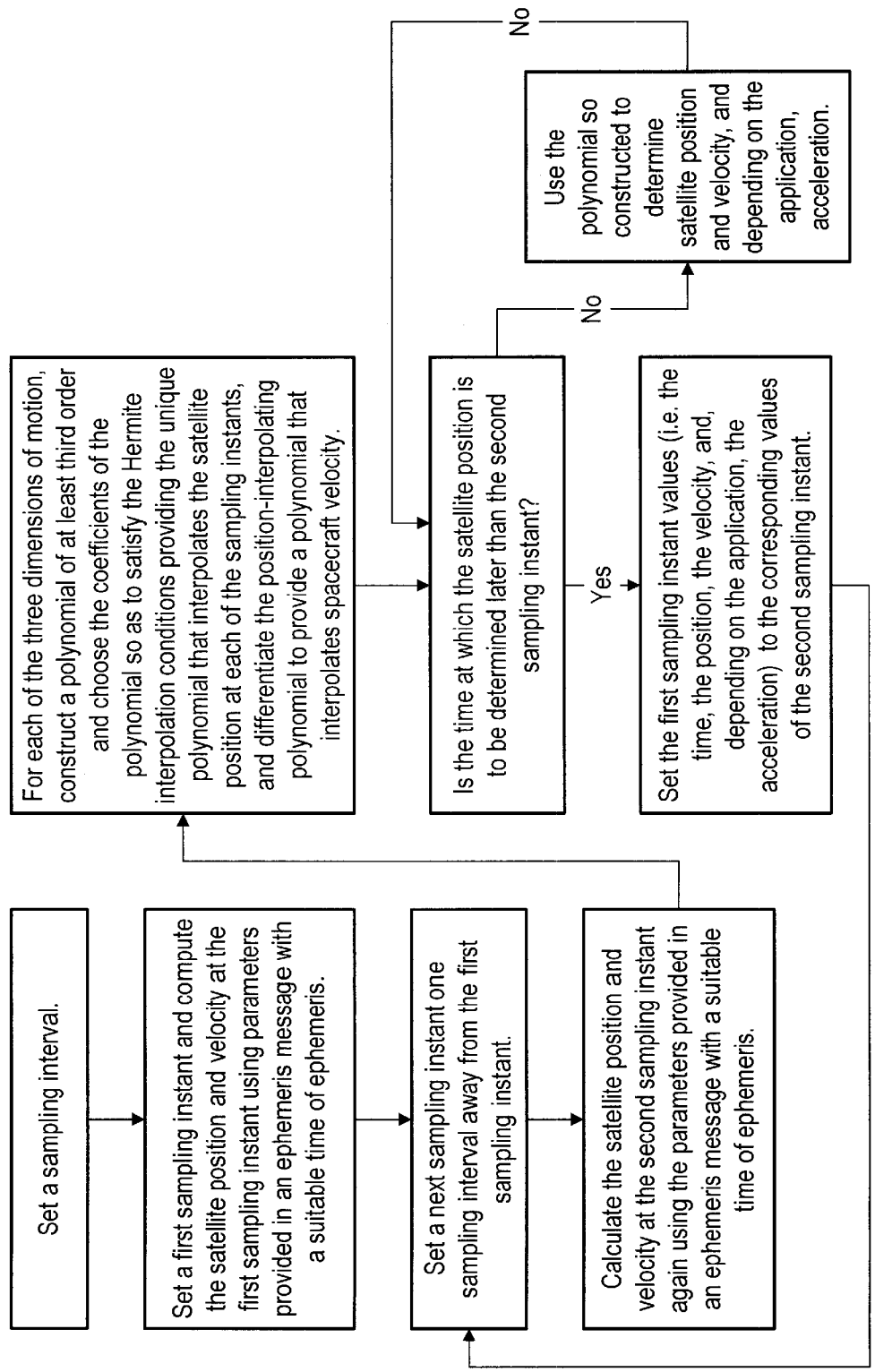
FIG. 2 is a flowchart indicating the method of interpolating between points on a curve (i.e. at different times) for spacecraft position or velocity, so as to provide values for spacecraft position and velocity between the interpolated points without having to perform a conventional ephemeris calculation.

Referring now to FIG. 2, a flowchart is shown of the method of the invention at a level of generality sufficient to comprehend using either a cubic Hermite interpolating polynomial, or a quintic Hermite interpolating polynomial.

Scope of the Invention

It is to be understood that the above-described arrangements are only illustrative of the application of the principles of the present invention. In particular, some of the computation required by an apparatus, such as a GPS receiver, according to the present invention can be performed outside of the apparatus. For example, a GPS receiver according to the present invention can communicate data needed by the method of the invention to a network connected to computing facilities that would determine the satellite position and velocity at the sampling points and possibly also determine the interpolating polynomials according to the invention, and communicate the results through the network back to the GPS receiver (via a wireless transmission). In addition, although the invention in the best mode has been described as relying on receiving an ephemeris message from the satellite whose motion is being determined, the present invention is intended to comprehend using other possible communications from a satellite, besides a standard ephemeris message, so long as the communication contains information sufficient to deduce at least the spacecraft position at the sample points. Numerous other modifications and alternative arrangements may be devised by those skilled in the art without departing from the spirit and scope of the present invention, and the appended claims are intended to cover such modifications and arrangements.

What is claimed is:
1. An apparatus for determining the position of a satellite at any instant of time between two sampling instants, based on information in one or more navigation messages provided by the satellite, the information allowing the computation of the satellite positions at the two sampling instants, each navigation message having a time of validity, the apparatus comprising:
   a) means for setting the first sampling instant;
   b) means for computing the satellite position at the first sampling instant using parameters provided in a first navigation message with a suitable time of validity;
   c) means for setting a next sampling instant later than the first sampling instant;
   d) means for computing the satellite position at the second sampling instant using parameters provided in the first navigation message if the first navigation message has a suitable time of validity, and otherwise using parameters in a second navigation message with a suitable time of validity; and
   e) means, for each of the three dimensions of motion, for constructing a polynomial of at least third degree by choosing the coefficients of the polynomial so that the polynomial interpolates the satellite position at each of the sampling instants.

2. The apparatus of claim 1 further comprising:
   a) means for computing the satellites velocities at each of the sampling instants based on the same parameters as were used in computing the satellite positions at the sampling instant; and
   b) means for choosing the coefficients of the polynomial for each of the three dimensions of motion so that the polynomial not only interpolates the satellite position at each of the sampling instants, but is such that its first derivative interpolates the satellite velocity at each of the sampling instants.

3. The apparatus of claim 2, wherein the polynomial is a Hermite interpolating polynomial.

4. The apparatus of claim 2, further comprising means for evaluating the polynomial at a desired instant of time between the two sampling instants.

5. The apparatus of claim 2, further comprising means for evaluating the first derivative of the polynomial at an instant of time between the two sampling instants so as to enable determining the spacecraft velocity at the instant of time.

6. The apparatus of claim 2, wherein the polynomial is of at least fifth degree, and further comprising:
   a) means for calculating the satellite acceleration at each of the sampling instants based on the same parameters as were used in computing the satellite positions at the sampling instant; and
   b) means for choosing the coefficients of the polynomial for each of the three dimensions of motion so that the polynomial corresponding to the two sampling instants not only interpolates the satellite position at the two sampling instants but is also such that its first derivative interpolates the satellite velocity at the two sampling instants and its second derivative interpolates the satellite acceleration at the two sampling instants.

7. The apparatus of claim 6, further comprising means for evaluating the second derivative of the polynomial at an instant of time between the two sampling instants so as to determine the spacecraft acceleration at the instant of time.

8. A method for determining the position of a satellite at any instant of time between two sampling instants, based on information in one or more navigation messages provided by the satellite, the information allowing the computation of the satellite positions at the two sampling instants, each navigation message having a time of validity, the method comprising the steps of:
   a) setting the first sampling instant;
   b) computing the satellite position at the first sampling instant using parameters provided in a first navigation message with a suitable time of validity;
   c) setting a next sampling instant later than the first sampling instant;
   d) computing the satellite position at the second sampling instant using parameters provided in the first navigation message if the first navigation message has a suitable time of validity, and otherwise using parameters in a second navigation message with a suitable time of validity; and
   e) for each of the three dimensions of motion, constructing a polynomial of at least third degree by choosing the coefficients of the polynomial so that the polynomial interpolates the satellite position at each of the sampling instants.

9. The method of claim 1, further comprising the steps of:
   a) computing the satellites velocities at each of the sampling instants based on the same parameters as were used in computing the satellite positions at the sampling instant; and
   b) choosing the coefficients of the polynomial for each of the three dimensions of motion so that the polynomial not only interpolates the satellite position at each of the sampling instants, but is such that its first derivative interpolates the satellite velocity at each of the sampling instants.

10. The method of claim 9, wherein the polynomial is a Hermite interpolating polynomial.

11. The method of claim 9, wherein, to obtain an approximate spacecraft position at a desired instant of time between the two sampling instants, the polynomial is evaluated at the desired instant of time.

12. The method of claim 11, wherein the derivative of the polynomial is evaluated at an instant of time between the two sampling instants so as to determine the spacecraft velocity at the instant of time.

13. The method of claim 9, wherein the polynomial is of at least fifth degree, and further comprising the steps of:
   a) calculating the satellite acceleration at each of the sampling instants based on the same parameters as were used in computing the satellite positions at the sampling instant; and
   b) choosing the coefficients of the polynomial for each of the three dimensions of motion so that the polynomial corresponding to the two sampling instants not only interpolates the satellite position at the two sampling instants but is also such that its first derivative interpolates the satellite velocity at the two sampling instants and its second derivative interpolates the satellite acceleration at the two sampling instants.

14. The method of claim 13, wherein the second derivative of the polynomial is evaluated at an instant of time between the two sampling instants so as to determine the spacecraft acceleration at the instant of time.

15. A system for determining the position of a satellite at any instant of time between two sampling instants, based on information in one or more navigation messages provided by the satellite, the information allowing the computation of the satellite positions at the two sampling instants, each navigation message having a time of validity, the system comprising:
   a) the satellite, for providing the ephemeris message;
   b) a receiver, for receiving the ephemeris message;
   c) means for setting the first sampling instant;
   d) means for computing the satellite position at the first sampling instant using parameters provided in a first navigation message with a suitable time of validity;
   e) means for setting a next sampling instant later than the first sampling instant;
   f) means for computing the satellite position at the second sampling instant again using parameters provided in the first navigation message if the first navigation message has a suitable time of validity, and otherwise using parameters in a second navigation message with a suitable time of validity; and
   g) means, for each of the three dimensions of motion, for constructing a polynomial of at least third degree by choosing the coefficients of the polynomial so that the polynomial interpolates the satellite position at each of the sampling instants.

16. The system of claim 15, further comprising:
   a) means for computing the satellites velocities at each of the sampling instants based on the same parameters as were used in computing the satellite positions at the sampling instant; and
   b) means for choosing the coefficients of the polynomial for each of the three dimensions of motion so as to provide a polynomial that not only interpolates the satellite position at each of the sampling instants, but is such that its first derivative interpolates the satellite velocity at each of the sampling instants.

17. The system of claim 16, wherein the polynomial is a Hermite interpolating polynomial.

18. The system of claim 16, further comprising means for evaluating the polynomial at a desired instant of time between the two sampling instants.

19. The system of claim 16, further comprising means for evaluating the first derivative of the polynomial at an instant of time between the two sampling instants so as to enable determining the spacecraft velocity at the instant of time.

20. The system of claim 16, wherein the polynomial is of at least fifth degree, and further comprising:
  a) means for calculating the satellite acceleration at each of the sampling instants based on the same parameters as were used in computing the satellite positions at the sampling instant; and
  b) means for choosing the coefficients of the polynomial for each of the three dimensions of motion so that the polynomial corresponding to the two sampling instants not only interpolates the satellite position at the two sampling instants but is also such that its first derivative interpolates the satellite velocity at the two sampling instants and its second derivative interpolates the satellite acceleration at the two sampling instants.

21. The system of claim 20, further comprising means for evaluating the second derivative of the polynomial at an instant of time between the two sampling instants so as to determine the spacecraft acceleration at the instant of time.

22. The system of claim 15, wherein at least some of means for computing the satellite position at a sampling instant are located in a facility external to the receiver, a facility that is in wireless communication with the receiver.

23. The system of claim 15, wherein at least some of the means for constructing, for each of the three dimensions of motion, the polynomial of at least third degree are located in a facility external to the receiver, a facility that is in wireless communication with the receiver.

24. The method of claim 8, wherein any navigation message is an ephemeris message, and further wherein any time of validity is a time of ephemeris.

25. The apparatus of claim 1, wherein any navigation message is an ephemeris message, and further wherein any time of validity is a time of ephemeris.

26. The system of claim 15, wherein any navigation message is an ephemeris message, and further wherein any time of validity is a time of ephemeris.

\* \* \* \* \*

UNITED STATES PATENT AND TRADEMARK OFFICE
CERTIFICATE OF CORRECTION

PATENT NO.    : 6,424,890 B1
DATED         : July 23, 2002
INVENTOR(S)   : Syrjärinne et al.

It is certified that error appears in the above-identified patent and that said Letters Patent is hereby corrected as shown below:

Column 1,
Line 30, "(ECEP)" should read -- (ECEF) --.

Column 4,
Lines 47 and 48, are a heading and should be italicized and preceded by a blank line.

Column 5,
Lines 15 and 16, are a heading and should be italicized and preceded by a blank line.
Line 67, is a heading and should be italicized and preceded by a blank line.

Column 6,
Line 5, is a heading and should be italicized and preceded by a blank line.

Column 7,
Line 53, "claim 1" should be -- claim 8 --.

Signed and Sealed this

Twenty-ninth Day of October, 2002

Attest:

*Attesting Officer*

JAMES E. ROGAN
*Director of the United States Patent and Trademark Office*